United States Patent [19]

Stewart et al.

[11] Patent Number: 4,697,671
[45] Date of Patent: Oct. 6, 1987

[54] BRAKEPAD ASSEMBLY FOR DISC BRAKE

[75] Inventors: John Stewart, West Horsley; George M. Brown, Twickenham, both of England

[73] Assignee: Twiflex Limited, Twickenham, England

[21] Appl. No.: 849,868

[22] Filed: Apr. 9, 1986

[30] Foreign Application Priority Data

| Apr. 12, 1985 [GB] | United Kingdom | 8509485 |
| Apr. 12, 1985 [GB] | United Kingdom | 8509486 |
| Apr. 12, 1985 [GB] | United Kingdom | 8509487 |

[51] Int. Cl.$^4$ .................. F16D 55/224; F16D 69/04
[52] U.S. Cl. ........................ 188/72.9; 188/250 G
[58] Field of Search .......... 188/71.8, 72.9, 73.1, 188/59, 196 F, 196 R, 216, 250 R, 250 B, 250 E, 250 F, 250 G, 261

[56] References Cited

U.S. PATENT DOCUMENTS

| 3,042,152 | 7/1962 | Butler | 188/250 R X |
| 3,162,271 | 12/1964 | Hanson | 188/73.1 |
| 3,285,370 | 11/1960 | Swift | 188/196 R X |
| 3,477,551 | 11/1969 | Beuchle et al. | 188/250 B X |
| 3,680,663 | 8/1972 | Kine | 188/72.9 X |
| 3,848,708 | 11/1974 | Noguchi | 188/250 B X |

FOREIGN PATENT DOCUMENTS

| 0138081 | 4/1985 | European Pat. Off. | 188/73.1 |
| 203356 | 9/1923 | United Kingdom . | |
| 1118833 | 7/1968 | United Kingdom . | |
| 1494730 | 12/1977 | United Kingdom | 188/72.9 |
| 2136518 | 9/1984 | United Kingdom . | |

Primary Examiner—Duane A. Reger
Attorney, Agent, or Firm—Marshall, O'Toole, Gerstein, Murray & Bicknell

[57] ABSTRACT

A brakepad assembly for a disc brake comprises a holder having a recess surrounded by end and side wall portions. A brakepad comprises a block of friction material having a metal strip bonded into its rear face, the strip having T-shaped end portions which can be bent into engagement with the wall portions releasably to hold the pad in position. The pad assemblies are pivoted to the ends of caliper arms and have the disc-engaging surfaces of the pads held parallel to the disc surfaces by resilient links which form with the arms a parallelogram linkage.

8 Claims, 6 Drawing Figures

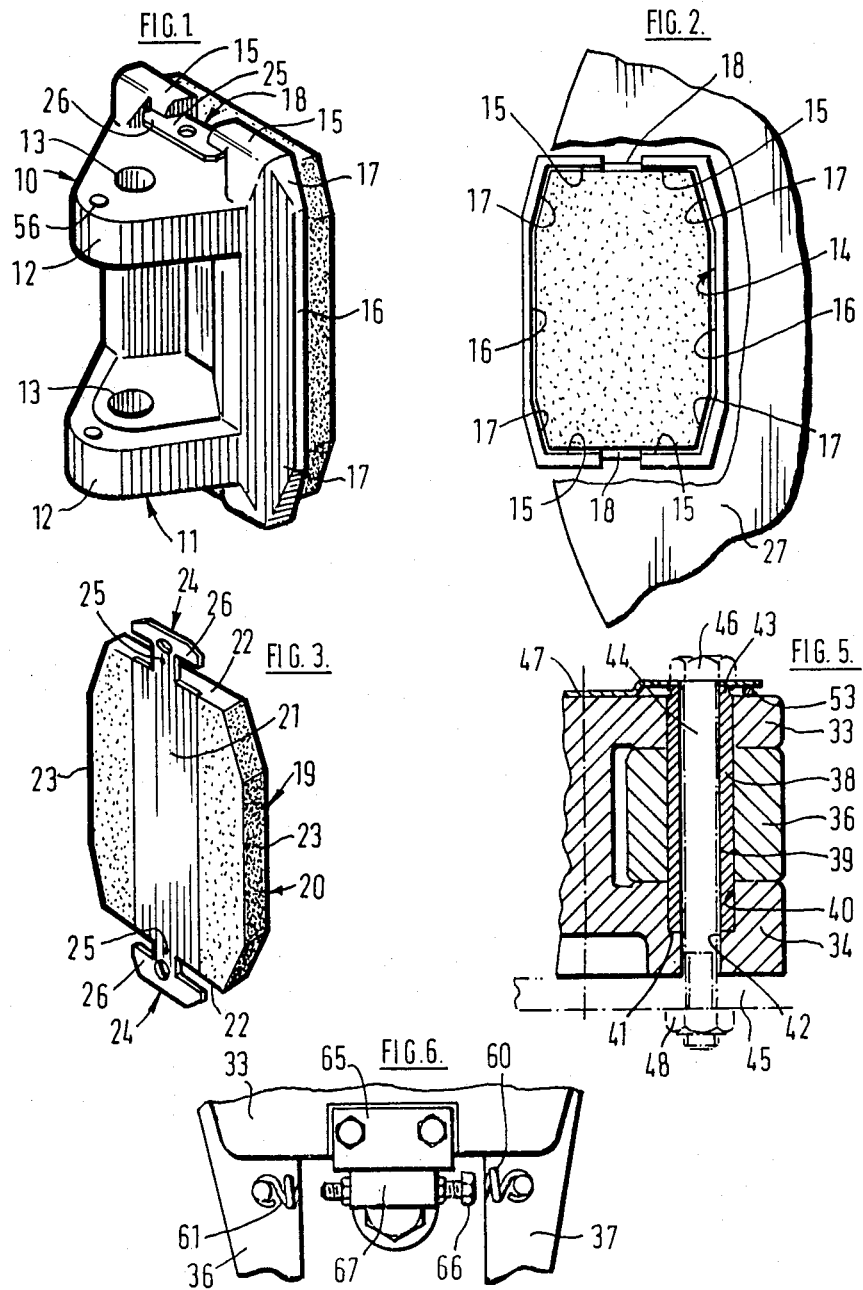

4,697,671

BRAKEPAD ASSEMBLY FOR DISC BRAKE

BACKGROUND TO THE INVENTION

Field of the Invention

This invention relates generally to disc brakes and particularly, but not exclusively to such brakes for industrial use.

This invention relates more specifically to brake pad assemblies for disc brake calipers and calipers including such brake pad assemblies.

Many proposals have been made for brake pad assemblies. For example it is known from British specification Nos. 1 185 176 and 1 477 755 to have pads of friction material permanently secured in recesses in a metal holder. When it is necessary to replace the pads both the carrier or holder and the pad have to be replaced.

It is also known to have channel shaped carriers in which the pads are mounted which have to be secured to the caliper arms by spring clips or other means.

An object of the invention is to provide an improved brake pad assembly in which the brake pad is releasably mounted in the holder but is, nevertheless, supported around substantially the whole of the periphery thereof.

SUMMARY OF THE INVENTION

According to the invention, therefore, we provide a brake pad assembly for use in a disc brake and comprising a holder, a brake pad releasably mounted in a recess in the holder so as to project therefrom, the recess having wall portions so arranged as to restrain movement of the brake pad relative to the holder in two pairs of opposite directions which, when the assembly is in use, are perpendicular to the rotary axis of the disc, one pair of said directions being perpendicular to the other pair of said directions, and cooperating securing means on the brake pad and the holder for releasably securing the brake pad in the recess.

Preferably the recess is of a shape complementary to that of the brake pad and said wall portions provide abutments cooperating with edge surfaces of the brake pad along the major part of the brake pad periphery.

Preferably also the securing means on the brake pad comprises a member which, after insertion of the brake pad into the recess, is deformable to engage the securing means on the holder. The member may be a metal strip secured to the rear of the brake pad and having end portions, which may be T-shaped, to provide the securing means, the stems of the T's passing through openings between the wall portions and the cross members of the T's engaging behind the wall portions to hold the pad in position. Preferably the metal strip is deformable by manual operation so as to make it very easy to insert and remove the brake pads.

A disc brake caliper comprises a base member and a pair of caliper arms pivoted to the base member. Each arm carries a brake pad assembly pivoted to the arm and each such assembly carries a brake pad having a surface to engage the disc.

It is another object of the invention to provide a disc brake caliper in which there is a parallelogram linkage but the links are resilient so that although the pads will first come into engagement with the disc surfaces in the correct orientation, if they are unevenly worn the links will be permitted to change their effective lengths so that the pads engage the disc surfaces over the whole surfaces of the pads.

According to another aspect of the invention, therefore, we provide a disc brake caliper comprising a base member; a pair of caliper arms pivoted to the base member; a brake pad assembly pivoted to each arm; a brake pad in each assembly having a surface to engage a disc; a pair of links each pivoted at one end to a respective brake pad assembly and at the other end to the base member so as to form a parallelogram linkage with the assembly, the arm on which the assembly is mounted and the base member; the links acting, when the brake pads are unworn, to hold the disc-engaging surfaces thereof parallel to the disc surfaces as such surfaces move towards engagement in use; the effective lengths of the links being variable against a resilient bias, thus permitting said disc-engaging surfaces to make contact over substantially the whole of their areas with the disc even if there has been uneven wear of the disc-engaging surfaces.

Preferably each link is resiliently deformable so as to effect changes in its effective length. Each link may comprise a piece of resilient wire having ends pivotally received in apertures in the base member and in a brake pad assembly. Each link may be provided between said ends with a resilient loop portion.

BRIEF DESCRIPTION OF THE DRAWINGS

The invention will now be described in detail by way of example with reference to the accompanying drawings in which:

FIG. 1 is a perspective view of a brake pad assembly;

FIG. 2 is an elevation of the assembly of FIG. 1 showing its relationship to a disc with the latter cut away;

FIG. 3 is a perspective view of a brake pad;

FIG. 5 is a detail section showing the means for pivoting the arms of the caliper of FIG. 4; and FIG. 6 is a detail view showing a modification of the caliper of FIGS. 4 and 5.

DESCRIPTION OF PREFERRED EMBODIMENT

Figure 4:
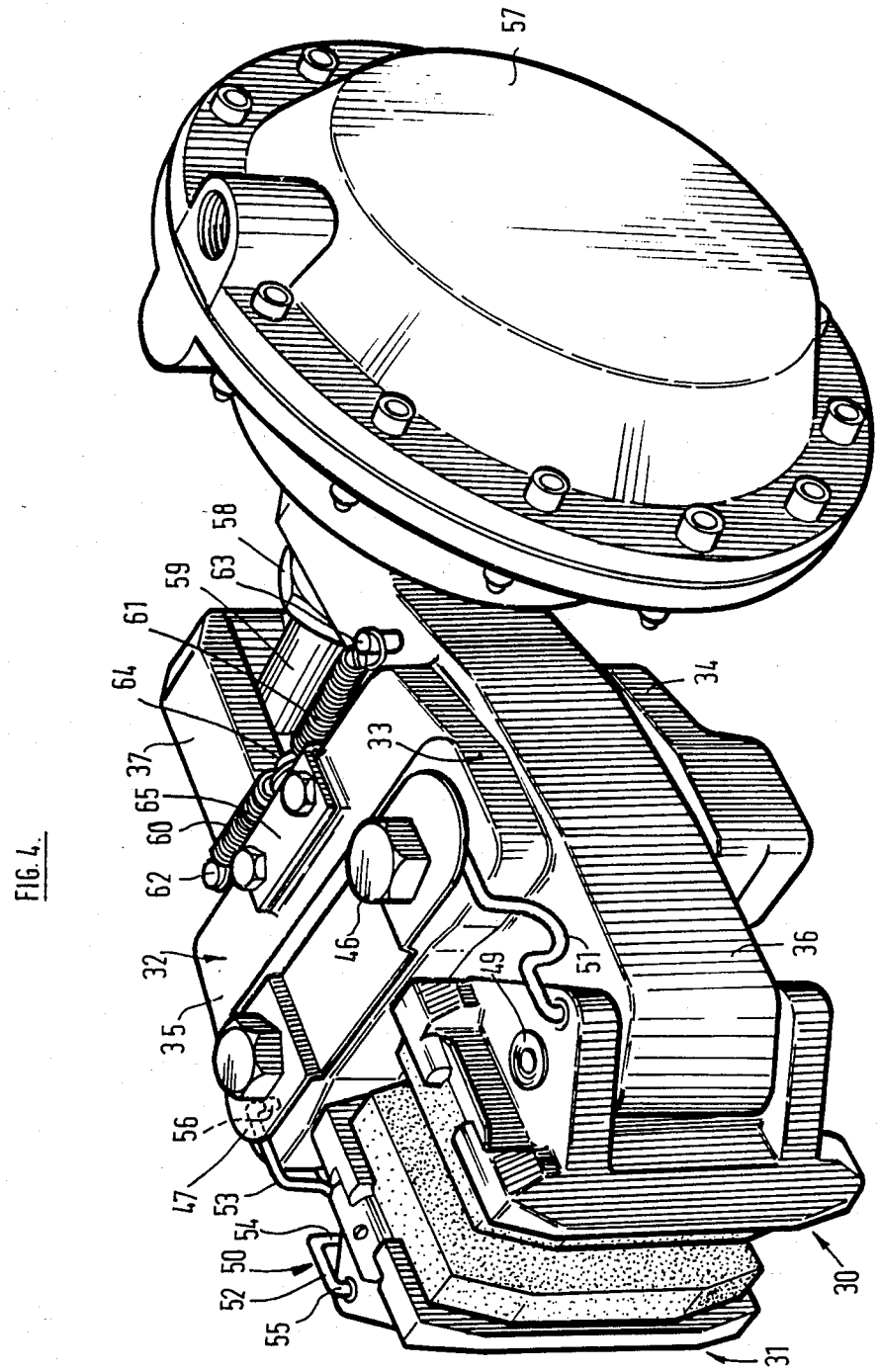
FIG. 4 is a perspective view of a disc brake caliper.

Referring now to FIGS. 1 to 3, the brake pad assembly is indicated generally at 10 and comprises a holder 11 which is a casting in light alloy and which has on the rear face thereof two trunnions 12 provided with aligned apertures 13.

The face of the casting remote from the trunnions 12 is formed with a recess 14 as shown in FIG. 2. The recess has end wall portions 15 and side wall portions 16. The side wall portions have inclined end parts 17. An opening 18 is provided between each pair of end wall portions 15.

A brake pad is indicated generally at 19 and comprises a block 20 of friction material to one face of which is bonded a metal strip 21. The strip is bonded in position during manufacture of the pad and as will be seen from FIG. 3 the strip is inset into the rear face of the pad to lie flush therewith. The pad is of a shape closely to fit within the recess 14 having a periphery comprising end walls 22 and side walls 23, the latter being of a shape to correspond with the side walls 16 of the recess 14.

The metal strip 21 provides means for releasably securing the brake pad in the holder 10 and has T-shaped end portions 24 each comprising a stem 25 and a cross member 26.

As clearly shown in FIGS. 1 and 2, the brake pad 19 can be placed within the recess 14 in the holder 10 and secured in position by bending over the end portions 24 so that the stems 25 lie in the openings 18 and the cross members 26 lie against the rear surfaces of wall portions 15. The cross members 26 and the surfaces of the wall portions 15 provide cooperating securing means for releasably securing the pad in the holder.

Thus when the pad is worn, the end portions 24 can be bent back to the position shown in FIG. 3, the worn pad removed, a new pad fitted into the recess and held there by deforming the end portions 24. The gauge of the metal strip 21 is preferably such that the strips can be deformed by finger pressure making it easy to instal and remove the brake pads.

FIG. 2 shows the disc 27 of a brake and it will be seen that the inclined end parts 17 of the pad are provided so as to avoid the pad overlapping the disc at the outer periphery thereof. The wall portions 15 and 16 of the recess 14 cooperate with the end walls 22 and the side walls 23 of the pad so as to restrain movement of the pad relative to the holder in two pairs of opposite directions, i.e. vertically and horizontally in FIG. 2, one pair of said directions being perpendicular to the other pair of said directions.

Thus the brake pad is substantially surrounded by the wall portions of the holder, most of the braking force being taken by the pairs of wall portions 15 with the wall portions 16 preventing sideways movement of the pad and the pad being held in position in the holder so that it moves away from the disc with the holder, by the deformed end portions 24.

Referring now to FIG. 4, this shows a complete brake caliper into which the brake pad assemblies of FIGS. 1 to 3 are fitted. There are two such assemblies indicated at 30 and 31 in FIG. 4. The caliper comprises a base member 32 having two pairs of upper and lower flanges. One such pair is indicated at 33 and 34. The upper flange of the other pair is indicated at 35.

Between the flanges 33 and 34 is pivoted an arm 36 and an arm 37 is pivoted between the upper (35) and lower flanges on the other side of the base member. The arms are pivoted in an identical fashion as shown in FIG. 5 for the arm 36. Referring to FIG. 5, a sleeve 38 is received in a bore 39 in the arm and provides a pivot for the arm. The lower end of the sleeve is received in a bore 40 in the flange 34, the bore having a shoulder 41 and continuing in a counter-bore 42. The upper end of the sleeve 38 stands proud of the upper surface of the flange 33 as shown at 43 and a bolt 44 passes through the sleeve 38 and the flange 34 and also through a support 45. The bolt has a head 46 which engages a plate 47, described below, which in turn engages the upper end of the sleeve 38, and a nut 48.

It will be seen that the sleeve 38 provides a pivot for the arm 36. The bolt 44 serves to hold the caliper to the support 45 and is prevented from pinching the flanges 33 and 34 together to nip the arm 36 by virtue of the fact that the sleeve 38 stands proud of the upper flange 33 at 43.

The brake pad assemblies 30 and 31 are pivoted to the ends of the arms 36 and 37 by pivot pins one of which is shown at 49, the pivot pins passing through the apertures 13 in the trunnions 12 of the holder 10.

Each of the brake pad assemblies 30 and 31 is controlled in its position by similar links 50 and 51. Referring to the link 50 by way of example, it has two aligned portions 52 and 53 connected by a resilient U-shaped loop 54. The end portion 52 has an end 55 which is at right angles to the portion 52 and is pivotally received in an aperture in the upper trunnion 12 as shown in FIG. 1. The end portion 53 similarly has an end 56 which is pivoted in the upper flange 33. As shown in FIG. 5, the plate 47 overlies the end portion 53 and retains the links in position while allowing them to pivot.

The brake pad assemblies 30 and 31 are moved together to apply the brake pads to the disc by means of a thruster 57 of any convenient type which is secured by nuts 58 to the arm 36 and has a rod 59 engaging the arm 37. The thruster may be operated by fluid pressure to extend the rod 59 to move the right-hand end of the arms in FIG. 4 apart thus moving the brake pads carried by the assemblies 30 and 31 into engagement with a disc (not shown) positioned between the assemblies 30 and 31. The arms are pulled back to an off position by means of tension springs 60 and 61 connected to pins 62 and 63 on the arms 37 and 36 respectively, the tension springs being anchored to a common projection 64 carried by a bracket 65 bolted to the upper flange 33.

The links 50 and 51 form, with the arms 36 and 37, parallelogram linkages. Thus, taking for example the arm 36 and the link 51, the arm is pivoted on the bolt 44 and sleeve 38 and the brake pad assembly 30 is pivoted on the pivot pin 49. The ends of the link 51 are pivotally mounted in the flange 33 and the trunnion 12 of the pad assembly 30 in such manner that, as the arms 36 and 37 move to bring the brake pads toward the disc, the brake pad engaging surfaces are retained parallel to the disc surfaces. Thus the distance between the two pivot points on the brake pad holder, i.e. the pivot point of the brake pad holder on the arm 36 and the pivot point of the link 51 on the holder is equal to the distance between the pivot point provided by the longitudinal axis of the bolt 44 and the pivot point of the link 51 on the flange 33.

It follows that when the brake pad surfaces are unworn they will be held so as to engage the disc surfaces in the correct positions parallel to the disc surfaces. However if the surfaces become unevenly worn, the resilient loops 54 in the links 50 and 51 may be deformed after the brake pads have engaged the disc so as to ensure full contact of the brake pad surfaces with the disc surfaces. If the links 50 and 51 are stressed due to uneven wear of the pads, the links will tend to redistribute the braking force across the area of the pad surface tending to even out the wear.

If the caliper is mounted as shown in FIG. 4 relative to the disc with the axes of the bolts 44 vertical then there is no force tending to pivot either of the arms 36, 37 so that its brake pad assembly engages a disc when the caliper is in the off position with the arms 36 and 37 withdrawn by the springs 60 and 61. However if the caliper is mounted, for example at a twelve o'clock position on a disc with the pivot axes of the arms horizontal, the weight of the thruster 57 secured to the arm 36 will tend to pivot the arm so as to bring the brake pad assembly 30 into engagement with the disc which is undesirable when the caliper is in an off position. Because of the springs 60 and 61 both arms 36 and 37 will pivot in the same direction. This may be prevented by the arrangement shown in FIG. 6 in which the bracket 65 carries a bolt 66 which is adjustable in a sleeve 67 and may be adjusted to prevent the arm 37 from pivoting in a clockwise direction in FIG. 6 to a sufficient extent to allow the arm 36 also to pivot in a clockwise direction to bring the brake pad carried by the arm into engagement with the disc. The arms will be held together by the springs 60 and 61 so that the arm 37 engages the end of the rod 59 and the arms will thus move together.

We claim:

1. A brake pad assembly for use in a disc brake and comprising a holder, a brake pad releasably mounted in a recess in the holder so as to project therefrom, the recess having a shape complementary to that of the brake pad and having peripheral wall portions so located as to cooperate with edge surfaces of the brake pad along a major part of the brake pad periphery and restrain movement of the brake pad relative to the holder in two pairs of opposite directions which, when the assembly is in use, are perpendicular to the rotary axis of the disc, one pair of said directions being perpendicular to the other pair of said directions, a pair of oppositely positioned openings between the wall portions and a deformable member fixed to and inset in the surface of the brake pad which engaged the base of the recess so as to be flush with said surface, said member having end portions passing through the openings and bent over to engage the holder to secure the brake pad therein.

2. An assembly according to claim 1 in which each said end portion is T-shaped, the stem of the T being received in one of said openings and the cross member of the T engaging the holder.

3. An assembly as claimed in claim 2 in which the said cross member of each T-shaped end portion engages surfaces of said wall portions adjacent to the opening in which the stem of the end portion lies.

4. An assembly as claimed in claim 1 wherein the recess is of generally rectangular shape with end walls and side walls and wherein the openings are formed in the end walls and at least one side wall has inclined end parts thus to cut off corners of said rectangular shape.

5. A disc brake caliper comprising a base member; a pair of caliper arms pivoted to the base member; a brake pad assembly as claimed in claim 1 pivoted to each arm; a pair of links each pivoted at one end to a respective brake pad assembly and at the other end to the base member so as to form a parallelogram linkage with the assembly, the arm on which the assembly is mounted and the base member; the links acting, when the brake pads are unworn, to hold the disc-engaging surfaces thereof parallel to the disc surfaces as such surfaces move towards engagement in use, the effective length of the links being variable against a resilient bias thus permitting said disc-engaging surfaces to make contact over substantially the whole of their areas with the disc even if there has been uneven wear of the disc engaging surfaces.

6. A caliper as claimed in claim 5 in which each link is resiliently deformable so as to effect changes in its effective length.

7. A caliper as claimed in claim 6 in which each link comprises a piece of resilient wire having ends pivotally received in apertures in the base member and in a brake pad assembly.

8. A caliper according to claim 7 in which each link is provided, between said ends, with a resilient loop portion.

* * * * *